May 24, 1927.
O. A. PRICE
1,629,637
AUTOMATIC SELF CLOSING VALVE
Filed June 26, 1926
3 Sheets-Sheet 3
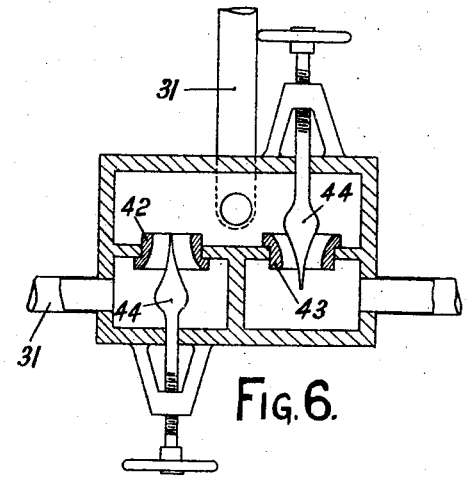
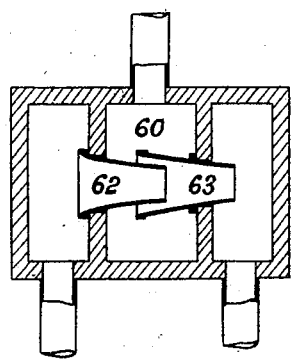
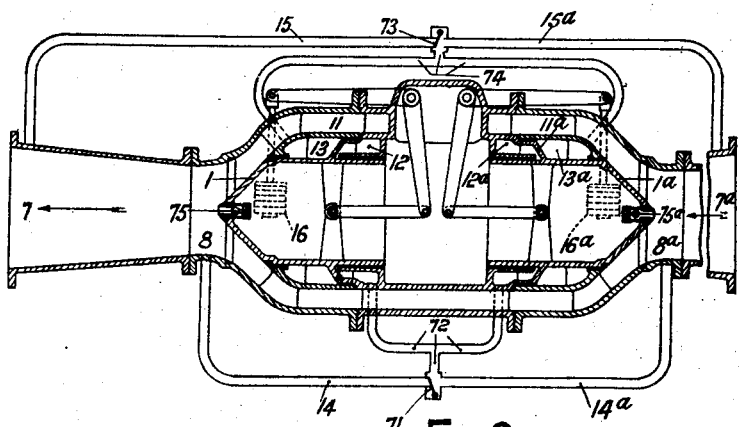
INVENTOR
OWEN ALFRED PRICE
BY Fetherstonhaugh & Co
ATTORNEYS Patented May 24, 1927.

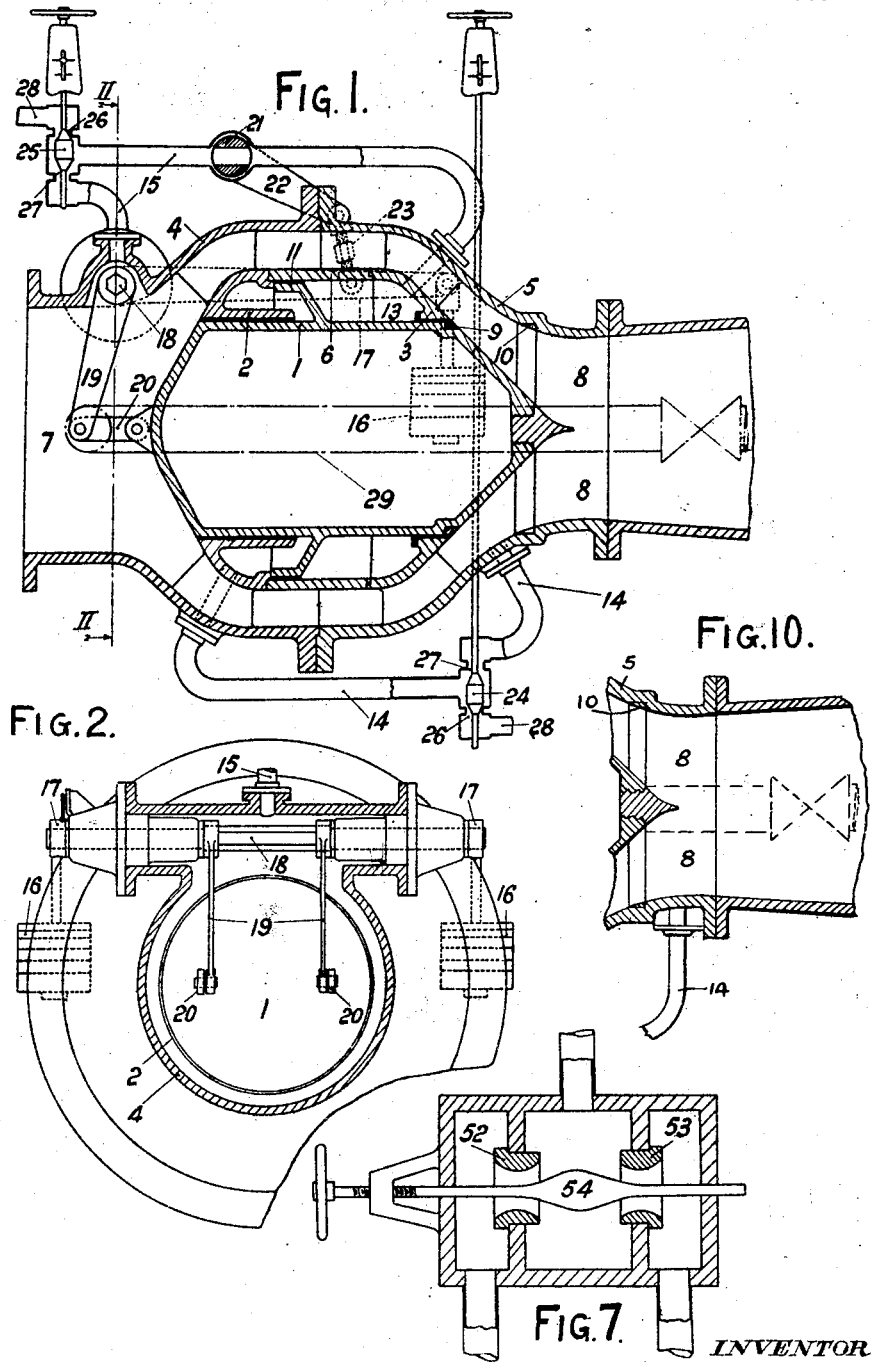

1,629,637

UNITED STATES PATENT OFFICE.

OWEN ALFRED PRICE, OF KILMARNOCK, SCOTLAND.

AUTOMATIC SELF-CLOSING VALVE.

Application filed June 26, 1926, Serial No. 118,852, and in Great Britain June 27, 1925.

This invention relates to an automatic self-closing valve to serve inter alia as an accident valve in a water main or in a water power penstock as a precaution against pipe bursts, or in any hydraulic system where automatic closing is required on occasion of a given excess of the rate of flow or any other change of flow conditions, such, for example, as reversal of flow.

An object of the invention is to provide such a valve which offers the minimum resistance to the normal flow and which will close with certainty on change of the conditions of flow without dependence on the operation of paddles, trip gear or actuating weights, or on the opening of cocks to hydraulic cylinders or on any mechanical movements, eliminating risk of failure to function due to sticking or breaking of mechanical parts or to errors of adjustment—a risk which must be reckoned with in view of the extreme rarity of the occasions on which operation of the valve is required and of the impossibility of testing it under such conditions as arise during an accident.

A further object is to provide a dash-pot cushion of such flexibility and power that slow closing, occupying several minutes, for example, or relatively quick closing may be effected according to circumstances.

Figure 3:
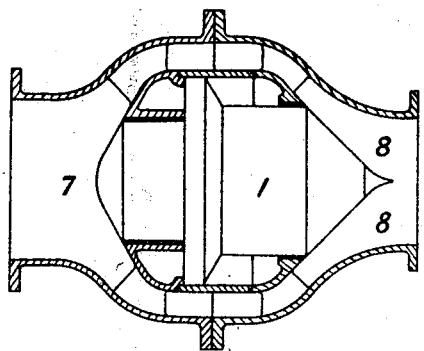
Figure 4:
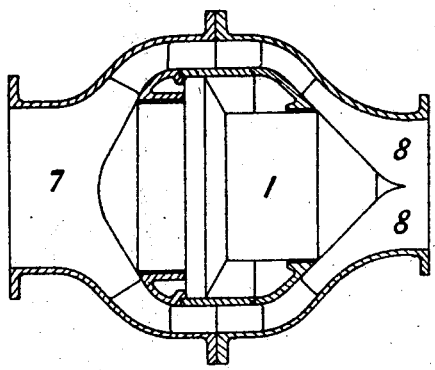
Figure 5:
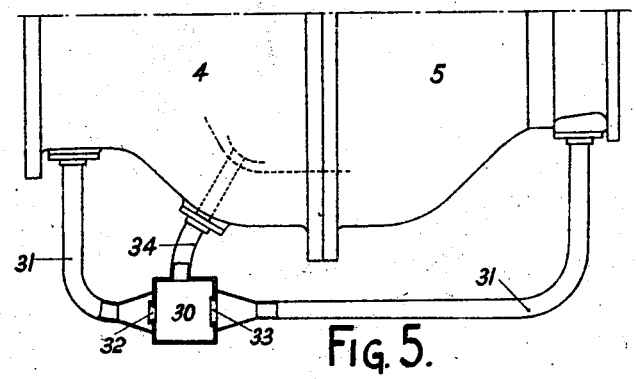

In the accompanying drawings Fig. 1 is a vertical section illustrating diagrammatically an automatic self-closing valve according to the invention; Fig. 2 is a fragmentary section on the line II—II of Fig. 1; Figs. 3 and 4 are sections to a smaller scale, showing modified constructions of the valve proper; Fig. 5 is a part elevation part section showing a valve equipped with means for adjusting the pressure acting on one side of the balancing piston; Figs. 6, 7 and 8 are detail views showing different forms of pressure adjusting means; Fig. 9 is a section showing a double-ended valve for automatic self-closing in both directions of flow. Fig. 10 is a fragmentary vertical sectional view of a modification.

As shown, the valve proper is constituted as a plunger 1 which is slidable within a stationary structure comprising annuli 2, 3, cast integral, respectively, with the sections 4, 5 of the valve chest, and an annulus 6 interposed between the annuli 2, 3 and coaxial therewith. The plunger 1 and annular structure 2, 3, 6 present a stream-lined body interposed in the conducting channel immediately in advance of a throat 8 or zone of less cross-sectional area than the main channel. As will be understood when flow takes place, the back of the plunger 1 is subject to the full pressure in the main 7 and the front of the plunger is subject to the lower pressure in the throat 8.

The front of the plunger 1 is fitted with a ring 9 in axial register with a seat ring 10 fitted to the section 5 of the valve chest.

Integral with the plunger 1 is a balancing piston 11 slidable within the annulus 6 and dividing the annular space between the plunger 1 and the structure 2, 3 and 6 into two compartments 12, 13. The compartment 12 is connected with the throat 8 by way of a valved pipe 14, and the compartment 13 is connected with the main 7 by way of a valved pipe 15.

The several areas of the plunger ends and balancing pistons are so proportioned that the total fluid pressure tending to close the valve is greater than the total fluid pressure tending to open it, that is, the sum of the forces acting on the back of the plunger 1 and on the back of the piston 11 is greater than the sum of the forces acting on the front of the plunger 1 and on the front of the piston 11, the plunger being supported approximately in equilibrium by these opposing forces.

To hold the plunger 1 stable for any required stream velocity, there is provided a pair of counterweights 16 carried externally of the valve chest at the free ends of a pair of levers 17 secured to a spindle 18 which is journalled in the chest section 4 and which is connected to the back of the plunger 1 by cranks 19 and links 20, the counterweights 16 being adjustable to balance the closing effort at the particular velocity desired.

The arrangement of the piston 11 in the structure 2, 3, 6 provides a dash-pot serving to cushion the closing movement of the plunger 1, so that the possibility of too rapid closure of the valve is precluded.

A throttle member 21 connected by a crank 22 and adjustable link 23 to either lever 17 is adapted to constrict the passage afforded by the pipe 15 as the plunger 1 moves towards closing position whereby to increase gradually the cushioning effect.

Located in the pipes 14 and 15, respectively, are exhaust valves 24 and 25 by manipulation of which the main valve may be controlled. Each valve 24 or 25 is adapted to seat on either of two seats 26 or 27, the seat 26 opening into an exhaust branch 28 and the seat 27 opening into the part of the pipe 14 or 15 leading to the throat 8 or main 7. With this arrangement, by lifting the valve 25 from the seat 26 water under pressure in the compartment 13 is released to exhaust whereupon the main valve closes. The main valve may be re-opened by restoring the valve 25 on to engagement with its seat 26 and lifting the valve 24 from its seat 26. 28 denotes the usual valve bypass.

The pipe 14 may be connected to the valve chest upstream of the seat ring 10, as shown in full lines in Fig. 1. With this arrangement as the column of water in the main 7 is brought to rest, due to the closing of the valve, the pressures on the two sides of the balancing piston 11 and on the back of the plunger approach the static pressure due to the head of water upstream of the valve, that is, the various pressures are equalizing, and, at the instant of closure, the net closing force is that due to the static pressure acting on an area equal to that enclosed within the seat ring 10. This powerful closing force, is, of course, built up very gradually and only comes into action at the last moment to force the valve on its seat.

Alternatively, the pipe 14 may be connected to the valve chest downstream of the seat ring 10, as shown in Fig. 10. With this arrangement the compartment 12 is never subject to the static pressure on the upstream side of the ring 10 either during or after closure. Therefore there is always considerably more retardation in closing with this than with the previous arrangement. In cases, therefore, where very high head exists, and undesirably rapid closing is likely to result, the pipe 14 is connected to the valve chest desirably on the downstream side of the ring 10.

In the modified construction shown in Fig. 3 the back end of the plunger 1 is of smaller diameter than the front end, such a construction being suitable for installation in a main in which the normal stream velocity is high and consequently the reaction pressure on the back of the plunger of considerable magnitude.

The modified construction of valve shown in Fig. 4 is suitable for installation in a main in which the normal stream velocity is low, the back end of the plunger 1 being of greater diameter than the front end.

In a valve installed in a water main or penstock in which the normal stream velocity is liable to alteration, provision may be made for maintenance in the compartments 12, 13 of pressures which are predetermined functions of the differential pressure between the main and throat. With such provision the piston 11 is preferably of relatively large diameter.

As shown in Fig. 5, a receiver 30 is interposed in a bypass connection 31 between the main channel and the throat, taking the place of the pipe 14, or the pipe 15. The receiver 30 is fitted with an inlet nozzle 32 and an outlet nozzle 33 and communicates with the chamber 12 or 13 by way of a pipe 34. The nozzles 32, 33 may be so designed that a pressure intermediate the pressure in the main and throat is set up in the receiver 30, and, consequently, in the chamber 12 or 13 to which it leads. Alternatively, the nozzles 32, 33 may be selected from sets of interchangeable nozzles.

In the form shown in Fig. 6 the nozzles 42, 43 are individually adjustable by means of adjustable obturator members 44.

In the form shown in Fig. 7 the nozzles 52, 53 are mutually adjustable by means of a single adjustable obturator member 54.

In the form shown in Fig. 8 the nozzles 62, 63 are long axially, the inlet nozzle 62 projecting within the outlet nozzle 63 so that the pressure set up in the receiver 60 and chamber 12 is lower than the pressure in the main and throat. The nozzles 62, 63 may be selected from sets of interchangeable nozzles or may be adjustable by means of an obturator member or obturator members.

For the purpose of explaining the operation of the arrangements shown in Figs. 5 to 8, let us suppose that a 42" valve with 33" throat is working on a penstock with a water velocity of 15 feet per second. The differential pressure will be about 2½ lbs. per square inch and with a plunger area of say 1000 square inches the closing force may be 2500 lbs. When balancing this about 300 lbs. could be left to the counterweight and 2200 lbs. could be balanced hydraulically.

If now the velocity is increased to 25 feet per second, the differential pressure becomes increased to about 7 lbs. per square inch. The closing force is now 7000 lbs. of which— with the same valve—5150 lbs. is now balanced hydraulically and 850 lbs. must be resisted by the counterweight. This might be an inconveniently heavy weight.

With the use of the pressure stepping device shown in Figs. 5 to 8 the counterweight may—if desired—still be 350 lbs. and the balancing chamber pressures controlled by means of the orifices so that 6700 lbs. is carried hydraulically and 300 lbs. remains to be balanced by the counterweight. This could be done by making the balancing piston larger in the first instance so that hydraulic balancing in the first instance would be effected with a fraction only of the 2½ lbs. per square inch differential pressure. When, subsequently the increased normal velocity is set up, a larger fraction of the then existing higher differential pressure can be used so that a larger proportion of the closing force can be hydraulically balanced, thus leaving less to be carried by the counterweight.

The double-ended automatic self-closing valve shown in Fig. 9 comprises two complete valve units disposed at an angle of 180° to one another and including plungers 1, 1ª formed with balancing pistons 11, 11ª subject to the action of water under pressure in chambers 12, 12ª and 13, 13ª.

Pipes 14, 14ª connected to corresponding points in the throats 8, 8ª lead by way of a common flap valve 71 and a branched pipe 72 to the chambers 12, 12ª. Similarly, pipes 15, 15ª connected to corresponding points in the main 7, 7ª lead by way of a common flap valve 73 and a branched pipe 74 to the chambers 13, 13ª. The flap valves 71 and 73, respectively, normally ensure that the upstream or higher pressure main 7ª will be connected respectively to the chamber 12ª and the throat 8ª with the chamber 13ª.

Fitted in the front or closing end of each plunger 1 or 1ª is a non-return ball valve 75 or 75ª which permits communication between the back of the other plunger 1ª or 1 and the main 7 or 7ª.

The valves function independently and in manner similar to that described with reference to Figs. 1 and 2.

The plunger 1, piston 11 and counterweights 16, respectively, may be proportioned differently from the plunger 1ª, piston 11ª and counterweights 16ª. The relative proportions may be such, for instance, that one valve closes on excess velocity in the normal direction of flow and the other valve closes on reversal of direction of flow.

What I claim is:

1. An automatic self-closing valve, comprising, in combination with a main conducting channel for fluid having a zone of less cross-sectional area than that of the remainder of the channel, there being unequal fluid pressures in the main channel and in said zone, a valve-forming plunger movable in said channel in the vicinity of said zone, said plunger having its closing movement in the direction towards said zone, said plunger exposed at its opposite ends to the said unequal pressures, an annular body surrounding said plunger, and spaced from the internal wall of said channel, a balancing piston movable with said plunger, one side of said piston being subject to one of said unequal pressures and the other side of said piston being subject to a pressure which is a predetermined function of the differential pressure between the main channel and said zone, and means serving normally to hold said plunger stable in open position but adapted to be overcome on a variation of said differential pressure occasioned by a given change of flow conditions to permit automatic closing movement of said plunger.

2. An automatic self-closing valve, comprising, in combination with a main conducting channel for fluid having a zone of restricted cross-sectional area, there being unequal pressures in said zone and in the main channel of unrestricted cross-sectional area, a valve-forming plunger movable in said channel in the vicinity of said zone, said plunger having its closing movement in the direction towards said zone, said plunger being exposed at its opposite ends to said unequal pressures, an annular body surrounding said plunger and spaced from the interior wall of said channel, a balancing piston movable with said plunger, a connection from said channel to one side of said piston, a by-pass between the unrestricted portion of said main channel and said zone, a receiver interposed in said by-pass, inlet and outlet nozzles fitted to said receiver, a connection from said receiver to the other side of said piston, and means serving normally to hold said plunger stable in open position but adapted to be overcome on a variation of the differential pressure between the main channel and said zone occasioned by a given change of flow conditions to permit automatic closing movement of said plunger.

3. An automatic self-closing valve, comprising, in combination with a main conducting channel for fluid having a zone of restricted cross-sectional area, there being unequal pressures in said zone and in the main channel of unrestricted cross-sectional area, a valve-forming plunger movable in said channel in the vicinity of said zone, said plunger having its closing movement in the direction towards said zone, said plunger exposed at its opposite ends to said unequal pressures, an annular body surrounding said plunger and spaced from the interior wall of said channel, a balancing piston movable with said plunger, connections for passage of fluid to either side of said piston, a by-pass between the unrestricted portion of said channel and said zone, a receiver interposed in said by-pass, and piped to one side of said piston, inlet and outlet nozzles fitted to said receiver, and means serving normally to hold said plunger stable in open position but adapted to be overcome on a variation of the pressures acting on said plunger and said piston occasioned by a given change of flow conditions to permit automatic closing movement of said plunger.

4. An automatic self-closing valve, comprising, in combination with a main conducting channel for fluid having a zone of restricted cross-sectional area, there being unequal pressures in said zone and in the main channel of unrestricted cross-sectional area, a valve-forming plunger movable in said channel in the vicinity of said zone, said plunger having its closing movement in the direction towards said zone, said plunger being exposed at its opposite ends to said unequal pressures, an annular body surrounding said plunger and spaced from the interior wall of said channel, a balancing piston movable with said plunger, said piston subject on its opposite sides to unequal fluid pressures, and means serving normally to hold said plunger stable in open position but adapted to be overcome on a variation of the differential pressure between said main channel and said zone occasioned by a given change of flow conditions to permit automatic closing movement of said plunger.

5. An automatic self-closing valve comprising, in combination with a main conducting channel for fluid having a zone of restricted cross-sectional area, there being unequal fluid pressures in said zone and in the main channel of unrestricted cross-sectional area, a valve-forming plunger movable endwise of said channel in the vicinity of said zone, said plunger having its closing movement in the direction towards said zone, the face of said plunger nearer to said zone being subject to the fluid pressure in said zone and the opposite face of said plunger being subject to the fluid pressure at a point of the main channel, an annular body surrounding said plunger within said channel leaving a passage between said body and the interior wall of said channel, a balancing piston movable with said plunger within said body, said piston being subject on its opposite sides to unequal fluid pressures, and means serving normally to hold said plunger in open position but adapted to be overcome on a variation of the differential pressure between a point of the main channel and said zone occasioned by a given change of flow conditions to permit automatic closing movement of said plunger.

In testimony whereof I have signed my name to this specification.

OWEN ALFRED PRICE.